United States Patent
Jiang et al.

(10) Patent No.: US 11,533,469 B2
(45) Date of Patent: Dec. 20, 2022

(54) PANORAMIC VIDEO PICTURE QUALITY DISPLAY METHOD AND DEVICE

(71) Applicant: KANDAO TECHNOLOGY CO., LTD., Shenzhen (CN)

(72) Inventors: Xiaoke Jiang, Shenzhen (CN); Rui Ma, Shenzhen (CN); Zhiyou Ma, Shenzhen (CN)

(73) Assignee: KANDAO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/266,112

(22) PCT Filed: Jul. 11, 2018

(86) PCT No.: PCT/CN2018/095328
§ 371 (c)(1),
(2) Date: Feb. 5, 2021

(87) PCT Pub. No.: WO2020/000521
PCT Pub. Date: Jan. 2, 2020

(65) Prior Publication Data
US 2021/0297654 A1 Sep. 23, 2021

(30) Foreign Application Priority Data
Jun. 27, 2018 (CN) .......................... 201810682259.7

(51) Int. Cl.
*H04N 7/00* (2011.01)
*H04N 13/383* (2018.01)
(Continued)

(52) U.S. Cl.
CPC ....... *H04N 13/383* (2018.05); *H04N 5/23238* (2013.01); *H04N 13/139* (2018.05); *H04N 13/15* (2018.05); *H04N 17/02* (2013.01)

(58) Field of Classification Search
CPC ............. H04N 13/383; H04N 5/23238; H04N 13/139; H04N 13/15; H04N 17/02; H04N 17/00
(Continued)

(56) References Cited

U.S. PATENT DOCUMENTS 6,246,413 B1 * 6/2001 Teo .......................... G06T 17/00
345/419
2010/0228840 A1 * 9/2010 Bose .................... H04L 67/1029
709/221
(Continued)

FOREIGN PATENT DOCUMENTS

| CN | 102316333 | 1/2012 |
| CN | 102821301 | 12/2012 |

(Continued)

OTHER PUBLICATIONS

"International Search Report (Form PCT/ISA/210) of PCT/CN2018/095328", dated Mar. 18, 2019, with English translation thereof, pp. 1-4.

*Primary Examiner* — Gims S Philippe
(74) *Attorney, Agent, or Firm* — JCIP Global Inc.

(57) ABSTRACT

The present application provides a panoramic video picture quality display method and device. Attention position information of a user at different time points in a preset period of time is obtained, the attention position information includes a picture horizontal angle; an attention information curve is created in a polar coordinate system, the attention information curve takes the time point as a polar radius and the picture horizontal angle obtained at the time point as a polar angle; and a picture quality parameter can also be obtained and the picture quality parameter is marked on the attention information curve to display the picture quality parameter.

12 Claims, 4 Drawing Sheets

(51) Int. Cl.
*H04N 13/15* (2018.01)
*H04N 13/139* (2018.01)
*H04N 5/232* (2006.01)
*H04N 17/02* (2006.01)

(58) Field of Classification Search
USPC .......................................................... 348/36
See application file for complete search history.

(56) References Cited

U.S. PATENT DOCUMENTS

| | | | | |
|---|---|---|---|---|
| 2013/0100132 A1* | 4/2013 | Katayama | ............ | H04N 13/275 |
| | | | | 345/420 |
| 2015/0170332 A1* | 6/2015 | Xu | ........................ | H04N 5/3415 |
| | | | | 382/275 |
| 2016/0112629 A1* | 4/2016 | Lee | ........................ | H04N 7/183 |
| | | | | 348/39 |

FOREIGN PATENT DOCUMENTS

| | | |
|---|---|---|
| CN | 106303513 | 1/2017 |
| KR | 20090113409 | 11/2009 |

\* cited by examiner

PANORAMIC VIDEO PICTURE QUALITY DISPLAY METHOD AND DEVICE

CROSS-REFERENCE TO RELATED APPLICATION

This application is a 371 of international application of PCT application serial no. PCT/CN2018/095328, filed on Jul. 11, 2018, which claims the priority benefit of China application no. 201810682259.7, filed on Jun. 27, 2018. The entirety of each of the above mentioned patent applications is hereby incorporated by reference herein and made a part of this specification.

FIELD

The present application relates to the field of multimedia technology, and in particular to a panoramic video picture quality display method and device.

BACKGROUND

With the development of video capture and processing technologies, a panoramic video has begun to step into people's lives. Panoramic video technology is developed from panoramic photography technology and is a video taken at all 360 degrees with a 3D camera, which carries a rich amount of information that allows changing scenes to be played in real time. People can freely select viewing angles in horizontal and vertical directions to browse scenes of interest in the panoramic video as if they are immersive.

A user can view the panoramic video through a VR headset, and a panoramic video player can perform stream cropping on the panoramic video picture for the user's view angle, e.g., the user views the front picture, and only part of the picture in front of the user can be transmitted to the VR headset for viewing.

To meet the higher visual experience of users, the panoramic video is increasingly demanding on picture quality, but the volume of panoramic video data is enormous, which obviously increases the difficulty of shooting and transmission of picture content, resulting in a display device's inability to smoothly play a high-resolution panoramic video, and an increasing play cost. In order to address the current state of a panoramic video with high picture quality, resolution reduction on part of content of a picture can be considered to reduce shooting cost and play cost. It is therefore necessary to study the user's interests to different pictures and provide a reference for picture adjustment with the user's interests.

In the prior art, a picture track of interest is constructed in a rectangular coordinate system where the x-axis is a picture frame of a panoramic video (i.e. play time) and the y-axis is angle information on a user viewing the panoramic picture, and a reference is provided for the capture and play of the panoramic video by studying the picture track of interest, see FIG. 1 for a specific schematic illustration. As can be seen from FIG. 1, the picture track of interest is a flattened presentation in the prior art and the picture track of interest fails to display picture quality and to provide accurate picture quality reference standards for the panoramic video intuitively and accurately.

Accordingly, it is necessary to provide a panoramic video picture quality display method and device to solve the problems in the prior art.

SUMMARY

Embodiments of the present application provide a panoramic video picture quality display method and device to address the technical problem in the prior art that accurate picture quality reference standards cannot be provided for a panoramic video intuitively and accurately.

In a first aspect, the present application provides a panoramic video picture quality display method, including:
obtaining attention position information of a user at different time points in a preset period of time, the attention position information including a picture horizontal angle;
creating an attention information curve in a polar coordinate system, the attention information curve taking the time point as a polar radius and the picture horizontal angle obtained at the time point as a polar angle;
obtaining a picture quality parameter and setting a color on the attention information curve to display the picture quality parameter by means of the color, different colors representing different picture quality parameters; and/or
setting a line width on the attention information curve to display the picture quality parameter by means of the line width, different line widths representing different picture quality parameters; and/or
setting a line type on the attention information curve to display the picture quality parameter by means of the line type, different line types representing different picture quality parameters;
the obtaining the picture quality parameter specifically includes:
obtaining an attention focus parameter, the attention focus parameter being used for representing an attention level of a user to a picture, and the attention focus parameter being a function of the picture horizontal angle;
obtaining a resolution distribution parameter, the resolution distribution parameter being used for representing the resolution distribution of a picture, and the resolution distribution parameter being a function of the picture horizontal angle; and
combining the attention focus parameter and the resolution distribution parameter to obtain the picture quality parameter.

In a second aspect, the present application provides a panoramic video picture quality display method, including:
obtaining attention position information of a user at different time points in a preset period of time, the attention position information including a picture horizontal angle;
creating an attention information curve in a polar coordinate system, the attention information curve taking the time point as a polar radius and the picture horizontal angle obtained at the time point as a polar angle; and
obtaining a picture quality parameter and marking the picture quality parameter on the attention information curve to display the picture quality parameter.

In one embodiment, the marking the picture quality parameter on the attention information curve to display the picture quality parameter specifically comprises:
setting a color on the attention information curve to display the picture quality parameter by means of the color, different colors representing different picture quality parameters; and/or
setting a line width on the attention information curve to display the picture quality parameter by means of the line width, different line widths representing different picture quality parameters; and/or
setting a line type on the attention information curve to display the picture quality parameter by means of the line type, different line types representing different picture quality parameters.

In one embodiment, the obtaining the picture quality parameter specifically comprises: obtaining an attention focus parameter, the attention focus parameter being used for representing an attention level of a user to a picture, and the attention focus parameter being a function of the picture horizontal angle; obtaining a resolution distribution parameter, the resolution distribution parameter being used for representing resolution distribution of a picture, and the resolution distribution parameter being a function of the picture horizontal angle; and combining the attention focus parameter and the resolution distribution parameter to obtain the picture quality parameter.

In one embodiment, the combining the attention focus parameter and the resolution distribution parameter to obtain the picture quality parameter specifically comprises:

integrating the attention focus parameter and the resolution distribution parameter over the picture horizontal angle to obtain the picture quality parameter Q, $Q=\int_0^{2\pi} F(x)P(x)dx$, wherein, $F(x)$ is the attention focus parameter and $P(x)$ is the resolution distribution parameter; or integrating the attention focus parameter and the resolution distribution parameter over the picture horizontal angle and a picture vertical angle to obtain the picture quality parameter Q, $Q=\int_0^{2\pi}\int_0^{\pi} F(x,y)P(x,y)dxdy$, wherein, $F(x, y)$ is the attention focus parameter, $P(x, y)$ is the resolution distribution parameter, and the attention position information also comprises the picture vertical angle.

In one embodiment, further comprising: adjusting the picture quality parameter according to the display of the attention information curve to enable the adjusted picture quality parameter to satisfy a quality requirement.

In one embodiment, the obtaining the attention position information of a user at different time points in a preset period of time specifically comprises:

obtaining multiple pieces of attention position information of the user in the preset period of time at a preset time interval, wherein each of the time points corresponds to one piece of the attention position information, and the picture horizontal angle is an attention position of eyes of the user to a picture in a horizontal direction at the time point.

In a third aspect, the present application provides a panoramic video picture quality display device, including:

a first obtaining module, configured to obtain attention position information of a user at different time points in a preset period of time, the attention position information including a picture horizontal angle;

a second obtaining module, configured to obtain a picture quality parameter;

a creating module, configured to create an attention information curve in a polar coordinate system, the attention information curve taking the time point as a polar radius and the picture horizontal angle obtained by the first obtaining module at the time point as a polar angle; and a processing module, configured to mark, on the attention information curve created by the creating module, the picture quality parameter obtained by the second obtaining module to display the picture quality parameter.

In one embodiment, the processing module, specifically configured to execute: setting a color on the attention information curve to display the picture quality parameter by means of the color, different colors representing different picture quality parameters; and/or setting a line width on the attention information curve to display the picture quality parameter by means of the line width, different line widths representing different picture quality parameters; and/or setting a line type on the attention information curve to display the picture quality parameter by means of the line type, different line types representing different picture quality parameters.

In one embodiment, the second obtaining module specifically comprises a first obtaining submodule, a second obtaining submodule and a third obtaining submodule:

the first obtaining submodule is configured to obtain an attention focus parameter, the attention focus parameter being used for representing an attention level of a user to a picture, and the attention focus parameter being a function of the picture horizontal angle;

the second obtaining submodule is configured to obtain a resolution distribution parameter, the resolution distribution parameter being used for representing resolution distribution of a picture, and the resolution distribution parameter being a function of the picture horizontal angle; and the third obtaining submodule is configured to combine the attention focus parameter obtained by the first obtaining submodule and the resolution distribution parameter obtained by the second obtaining submodule to obtain the picture quality parameter; wherein, the third obtaining submodule is specifically configured to execute:

integrating the attention focus parameter and the resolution distribution parameter over the picture horizontal angle to obtain the picture quality parameter Q, $Q=\int_0^{2\pi} F(x)P(x)dx$, wherein, $F(x)$ is the attention focus parameter and $P(x)$ is the resolution distribution parameter; or integrating the attention focus parameter and the resolution distribution parameter over the picture horizontal angle and a picture vertical angle to obtain the picture quality parameter Q, $Q=\int_0^{2\pi}\int_0^{\pi} F(x, y)P(x, y)dxdy$, wherein, $F(x, y)$ is the attention focus parameter, $P(x, y)$ is the resolution distribution parameter, and the attention position information also comprises the picture vertical angle.

In one embodiment, further comprising: an adjusting module, the adjusting module is configured to adjust the picture quality parameter according to the display of the attention information curve to enable the adjusted picture quality parameter to satisfy a quality requirement.

Compared to the prior art, in the panoramic video picture quality display method and device of the present application, attention position information of a user at different time points in a preset period of time is obtained, the attention position information includes a picture horizontal angle; an attention information curve is created in a polar coordinate system, the attention information curve takes the time point as a polar radius and the picture horizontal angle obtained at the time point as a polar angle; and a picture quality parameter can also be obtained and the picture quality parameter is marked on the attention information curve to display the picture quality parameter. In such a way, the change track of an attention position of the user and changes in picture quality can clearly be acquired from the attention information curve; in addition, as the displayable angle of the polar coordinate system is in the range of 360 degrees, which is consistent with the picture horizontal angle when the user views a panoramic video; the attention information curve is created in the polar coordinate system, so that the change track of an attention position and the picture quality of each region can be obtained more intuitively and accurately; and the technical problems that the picture track of interest of a panoramic video is a flattened presentation, the picture quality cannot be displayed, and accurate picture quality reference standards cannot be provided for the panoramic video intuitively and accurately in the prior art are solved.

BRIEF DESCRIPTION OF THE DRAWINGS

The present application will now be explained in further detail with reference to the drawings and embodiments.

DETAILED DESCRIPTION OF THE EMBODIMENTS

The technical solutions in embodiments of the present application will now be clearly and fully described in conjunction with the accompanying drawings in embodiments of the present application, and it will be apparent that the described embodiments are only some, but not all, embodiments of the present application. Based on the embodiments in the present application, all other embodiments obtained by a person skilled in the art without creative work fall in the scope of protection of the present application.

In a panoramic video picture quality display method and device of the present application, attention position information of a user at different time points in a preset period of time is obtained, the attention position information includes a picture horizontal angle; an attention information curve is created in a polar coordinate system, the attention information curve takes the time point as a polar radius and the picture horizontal angle obtained at the time point as a polar angle; and a picture quality parameter can also be obtained and the picture quality parameter is marked on the attention information curve to display the picture quality parameter. In such a way, the change track of an attention position of the user and changes in picture quality can be clearly acquired from the attention information curve; in addition, as the displayable angle of the polar coordinate system is in the range of 360 degrees, which is consistent with the picture horizontal angle when the user views a panoramic video; the attention information curve is created in the polar coordinate system, so that the change track of an attention position and the picture quality of each region can be obtained more intuitively and accurately; and the technical problems that the picture track of interest of a panoramic video is a flattened presentation, the picture quality cannot be displayed, and accurate picture quality reference standards cannot be provided for the panoramic video intuitively and accurately in the prior art are solved.

The panoramic video picture quality display method provided in the present application will be described in detail with reference to specific embodiments. The method includes the following steps: obtaining attention position information of a user at different time points in a preset period of time, the attention position information including a picture horizontal angle; creating an attention information curve in a polar coordinate system, the attention information curve taking the time point as a polar radius and the picture horizontal angle obtained at the time point as a polar angle; obtaining a picture quality parameter and marking the picture quality parameter on the attention information curve to display the picture quality parameter.

Figure 1:
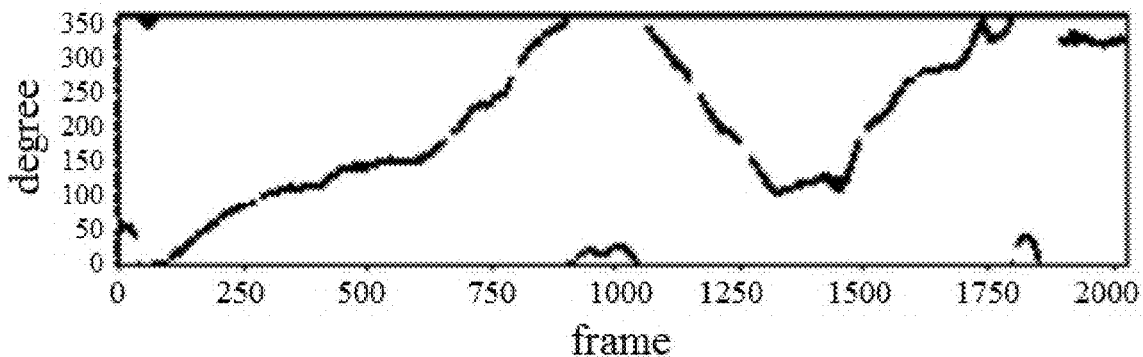
FIG. 1 is a schematic diagram of a picture track of interest according to the prior art.
Figure 2:
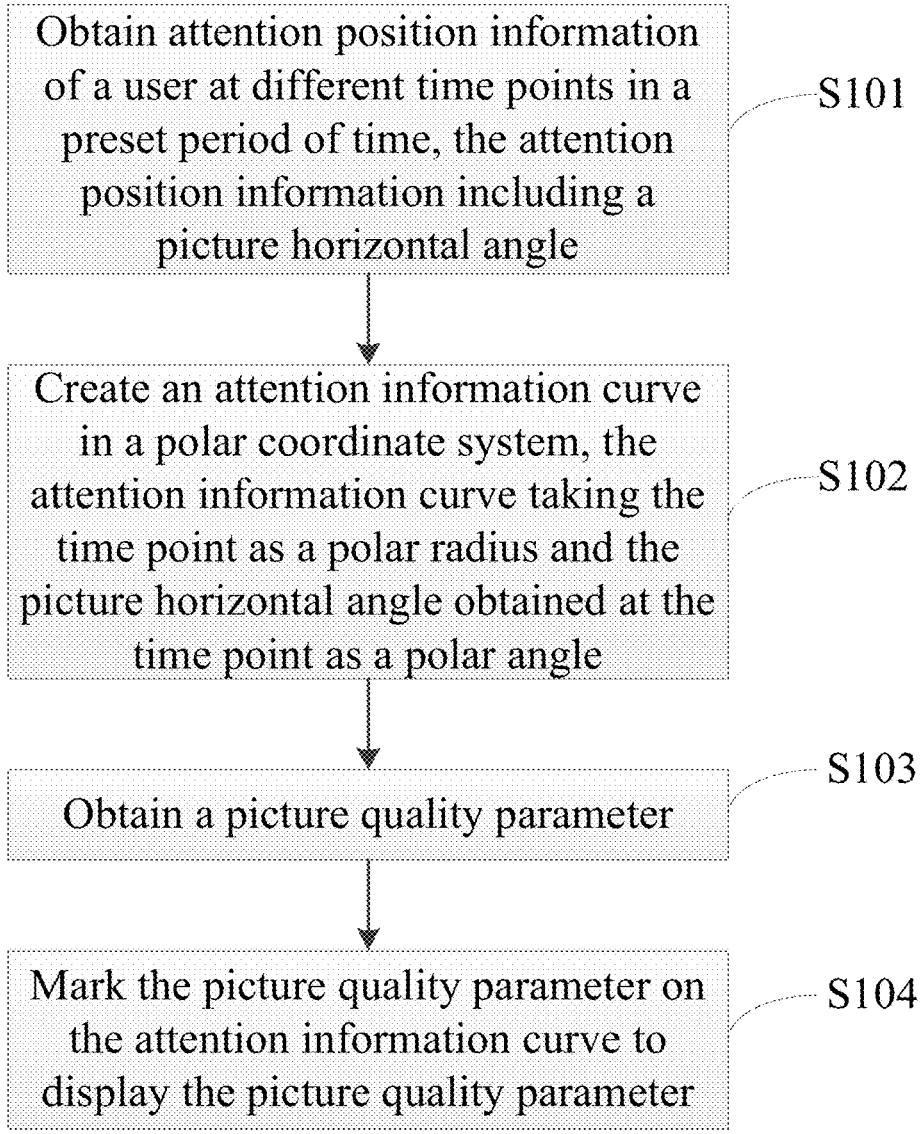
FIG. 2 is a flow chart of a panoramic video picture quality display method according to an embodiment of the present application.

Referring to FIG. 2, FIG. 2 is a flow chart of a panoramic video picture quality display method according to an embodiment of the present application, and the method may include:

S101, attention position information of a user at different time points in a preset period of time is obtained, the attention position information including a picture horizontal angle.

A panoramic video can provide a 360-degree view angle for a user, however, the user can only focus, at a certain time point, a certain position in the picture, which is attention position information including a picture horizontal angle, and the picture horizontal angle refers to attention position information of eyes of the user to the picture in the horizontal direction.

In the embodiment, a change in attention position information in a period of time of the panoramic video may be obtained, and a change in attention position information of a complete panoramic video may also be obtained, that is, a preset period of time may be a period of play time of the panoramic video or a complete play time of the whole panoramic video.

In an alternative embodiment, in order to reduce the amount of computation, attention position information may be obtained at a certain time interval, the specific time interval is subject to user setting and is not limited herein. For example, one piece of attention position information is obtained every 10 frames or one piece of attention position information is obtained every 1 frame. If a panoramic video with the complete play time being 2000 frames and the time interval of capturing attention position information being 1 frame is taken as an example, 2000 pieces of attention position information may be captured from the video.

It will be appreciated that the attention position information of different users may vary slightly, which results in different attention position information of different users, and in order to address this problem, the obtained attention position information of each user may be used to separately construct an attention information curve, so that changes in the attention positions of different users can be represented. In this way, the viewing habits of different users can be acquired, resulting in personalized features of the users.

In an alternative embodiment, the obtaining the attention position information may specifically include: obtaining multiple pieces of attention position information of each user in a preset period of time at a preset time interval, each time point corresponding to one piece of the attention position information, and then displaying the obtained position information of each user on an attention information curve.

It should be noted that the attention position information of the user may be obtained in other ways, for example, attention position information of a large number of users is obtained by using big data collection to obtain attention position information of general users, thereby satisfying the viewing needs of most users. A correction value may also be introduced to correct the obtained attention position information, and the corrected attention position information is used to construct an attention information curve.

S102, an attention information curve is created in a polar coordinate system, the attention information curve taking the time point as a polar radius and the picture horizontal angle obtained at the time point as a polar angle.

Attention position information at each time point is obtained in S101, and the attention information curve may be constructed in the polar coordinate system according to the attention position information, wherein the polar axis of the polar coordinate system is time, and the constructed attention information curve takes the time point as the polar radius and the picture horizontal angle obtained at the time point as the polar angle.

In an alternative embodiment, in order to reduce the amount of computation, multiple pieces of attention position information may be obtained at a preset time interval, the multiple pieces of attention position information are marked in the polar coordinate system by means of coordinate points, then all coordinate points are connected to obtain a complete attention information curve. For example, a video with the complete play time being 2000 frames and the time interval being 10 frames is taken as an example, one piece of attention position information may be obtained every 10 frames, each coordinate point is marked in the polar coordinate system, and the coordinate point is an ordered pair of time point and attention position information, then 200 coordinate points may be obtained in total and the 200 coordinate points are connected to obtain the complete attention information curve, wherein the method for connecting the coordinate points includes, but not limited to, a spline curve method, a curve-fitting method or a spline curve interpolation method.

When a user views a panoramic video, 360-degree free switch of pictures may be realized in the horizontal direction, the displayable angle of the polar coordinate system is in the range of 360 degrees, which is consistent with the picture horizontal angle when the user views the panoramic video, and the attention information curve is created in the polar coordinate system, so that the change track of an attention position and the picture quality of each region can be obtained more intuitively and accurately.

S103, a picture quality parameter is obtained.

In the embodiment, the picture quality parameter at each time point may be obtained in a preset method, and the picture quality parameter is related to an attention position of the user at the time point, such as the picture horizontal angle.

In an alternative embodiment, a picture quality parameter obtaining method is provided, specifically including the following steps:

A1, an attention focus parameter is obtained, the attention focus parameter being used for representing an attention level of a user to a picture, and the attention focus parameter being a function of the picture horizontal angle;

A2, a resolution distribution parameter is obtained, the resolution distribution parameter being used for representing the resolution distribution of a picture, and the resolution distribution parameter being a function of the picture horizontal angle; and A3, the attention focus parameter and the resolution distribution parameter are combined to obtain the picture quality parameter.

In A2, the resolution distribution parameter may be obtained by a resolution estimated value and the picture horizontal angle, that is, specific steps of obtaining the resolution distribution parameter may include: generating a resolution estimated value of each picture horizontal angle of a video picture according to the attention focus parameter, and generating the resolution distribution parameter according to the resolution estimated value of each picture horizontal angle of a video picture.

In A3, a method of combining the attention focus parameter and the resolution distribution parameter may be integration, and specific operation may at least include the following cases:

in one case, when there is a very small difference in the attention of the user to the picture content in the vertical direction, the attention focus parameter and the resolution distribution parameter may be integrated only over the picture horizontal angle to obtain the picture quality parameter Q, $Q=\int_0^{2\pi} F(x)P(x)dx$, wherein, $F(x)$ is the attention focus parameter, $P(x)$ is the resolution distribution parameter, and the value range of the picture horizontal angle is $0$-$2\pi$;

in another case, when the user has more attentions on the picture content in the vertical direction and the picture content in the horizontal direction, that is, there is a greater difference in the vertical content and horizontal content of the picture, in order to better guarantee the accuracy of picture quality assessment, the attention focus parameter and the resolution distribution parameter are integrated over the picture horizontal angle and a picture vertical angle to obtain the picture quality parameter Q, $Q=\int_0^{2\pi}\int_0^{\pi} F(x,y)P(x,y)dxdy$, wherein, $F(x, y)$ is the attention focus parameter, $P(x, y)$ is the resolution distribution parameter, the attention position information also includes the picture vertical angle, and the value range of the picture horizontal angle is $0$-$2\pi$, the value range of the picture vertical angle is $0$-$\pi$.

The picture quality parameter is obtained according to data of a single user. In the embodiment, the picture quality may be assessed according to a calculation result of a single user, and the picture quality may also be assessed according to calculation results of a plurality of users. If the picture quality is assessed according to calculation results of a plurality of users, an average picture quality parameter may be obtained by averaging after the picture quality parameters of a plurality of users are obtained, and the picture quality is assessed according to the average picture quality parameter, namely the picture quality of a video picture generated by the current picture stream cropping mode is assessed.

It should be noted that the timing sequence of S103 is unrelated to the timing sequences of S101 and S102, S101 and S102 may be performed prior to S103, or vice versa, or S101 and S103 are performed at the same time.

S104, the picture quality parameter is marked on the attention information curve to display the picture quality parameter.

There are various ways of marking the picture quality parameter on the attention information curve; the picture quality parameter is marked by using, for example, colors, line widths and line types on the attention information curve; and attention information curves with different colors, line widths and line types may represent different picture quality parameters.

In an alternative embodiment, a continuous quality score (the picture quality parameter is expressed as a value, which is corresponding to a quality score) may be represented by using the gradual change of colors, line widths and line types on the attention information curve. For example, as to the gradual RGB change of colors, the higher the B hue, the higher the quality score, and the higher the R hue, the lower the quality score; as to the gradual change of line widths, the thicker the line width, the higher the quality score, or the thinner the line width, the lower the quality score; and the style change of line types is related to the quality score, wherein the higher the quality score, the better the picture quality. In the embodiment of the present application, value subdivision is performed on the picture quality parameter, and the picture quality scores at different time/different attention positions can be known at any time on the attention information curve so that finer and more accurate adjustment can be made to the picture quality.

Figure 3:
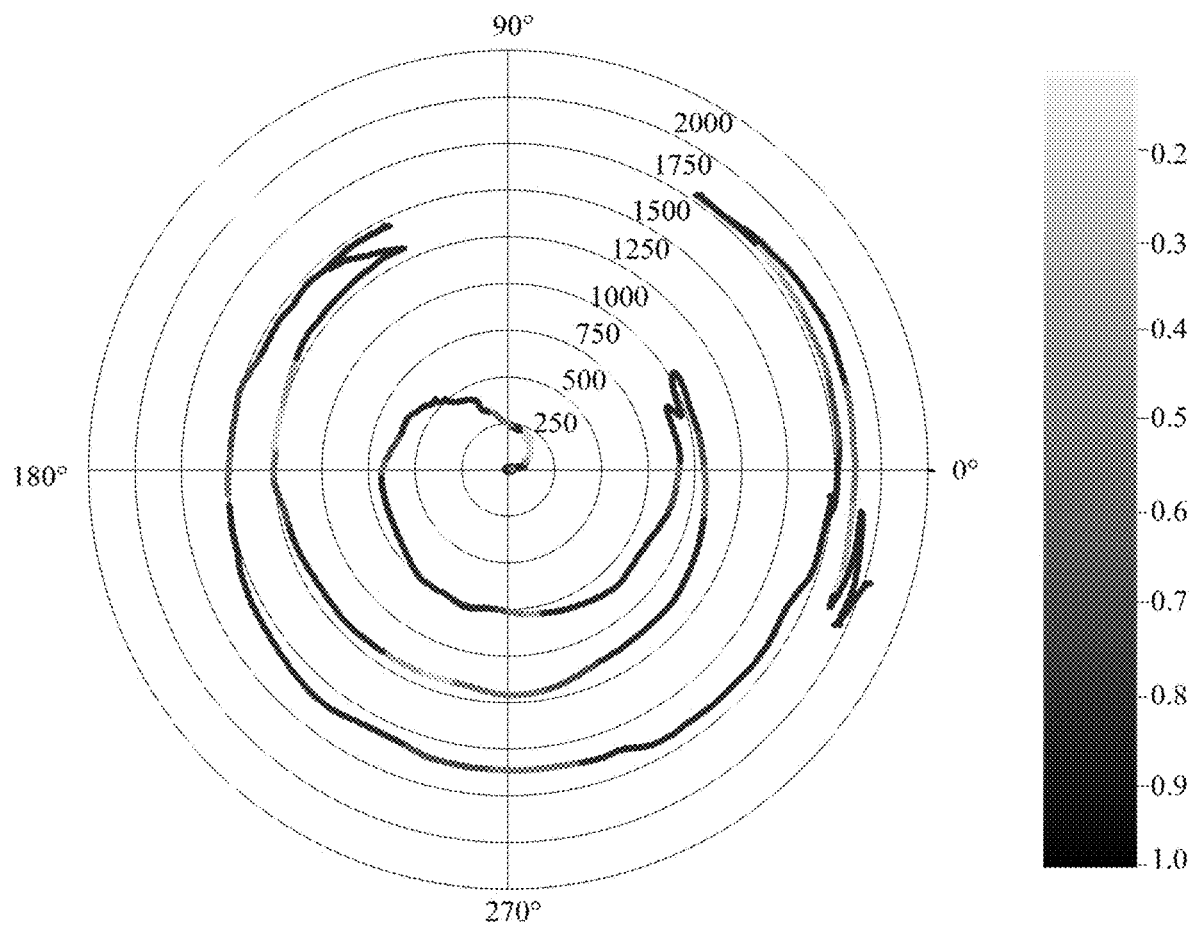
FIG. 3 is a schematic diagram of an attention information curve according to an embodiment of the present application.

Referring to FIG. 3, FIG. 3 is a schematic diagram of an attention information curve marked in the polar coordinate system, and on the attention information curve in the figure, the value of the picture quality parameter is represented with a color, wherein, gray with different RGB values is used to represent different picture quality parameters in FIG. 3 for convenience of representation, and a gray histogram in the figure represents a corresponding relation of the values of the picture quality parameter and different RGB values. It can be seen from FIG. 3 that an attention information curve with 2000 frames is marked in the polar coordinate system, the value range of the picture quality parameter is 0-1.0, and the smaller the RGB value of gray, the larger the value of the picture quality parameter. As shown by the attention information curve in FIG. 3, the magnitude of the picture quality parameter at different time/different attention positions can be known at any time on the attention information curve, and the change track of the attention position of the user and changes in the picture quality can be obtained more intuitively and accurately so that finer adjustment can be made to the picture quality.

In an alternative embodiment, whether or not the picture quality satisfies the quality requirement (the picture quality parameter is expressed as whether or not satisfying the quality requirement) may be represented with different colors, line widths and line types on the attention information curve. For example, as the color is of warm hue, it represents that the picture quality satisfies the quality requirement; as the color is of cold hue, it represents that the picture quality does not satisfy the quality requirement. As the line width of the attention information curve exceeds a certain value, it represents that the picture quality satisfies the quality requirement; as the line width of the attention information curve does not exceed a certain value, it represents that the picture quality does not satisfy the quality requirement. As the line type of the attention information curve is a solid line, it represents that the picture quality satisfies the quality requirement. Whether or not the picture quality satisfies the quality requirement can rapidly be identified on the attention information curve in the embodiment of the present application, and the pictures that do not satisfy the quality requirement can rapidly be adjusted.

Figure 4:
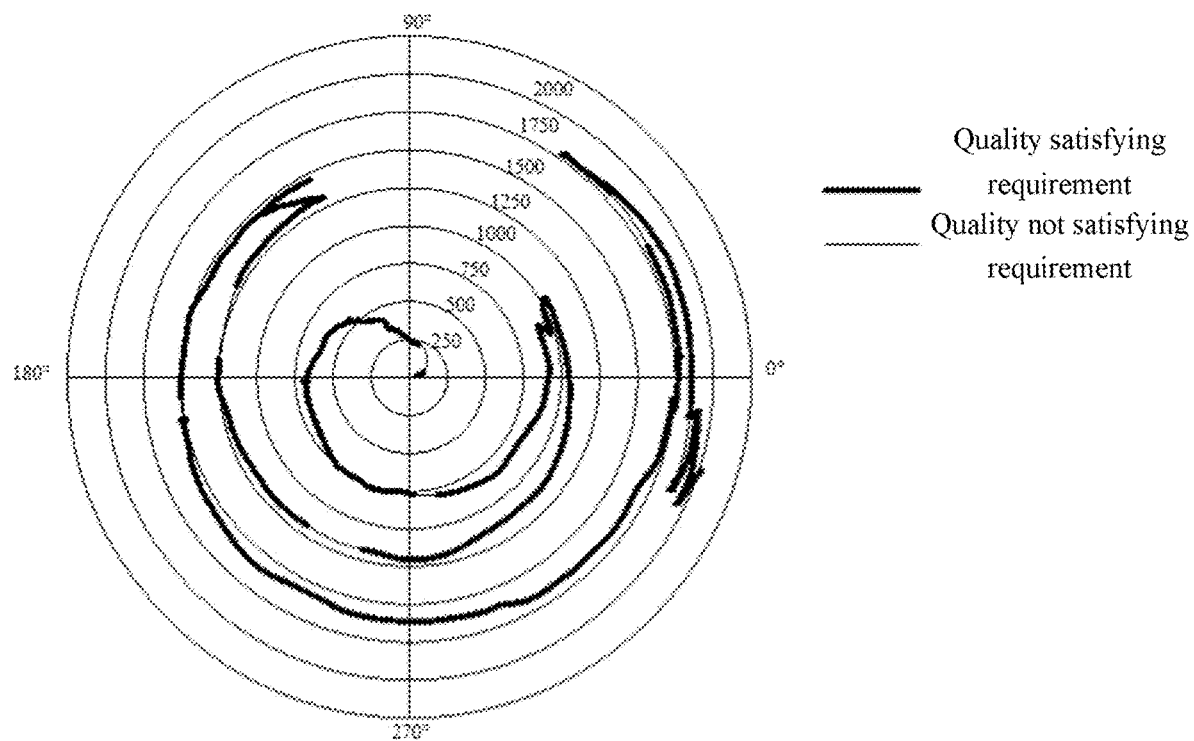
FIG. 4 is another schematic diagram of an attention information curve according to an embodiment of the present application.

Referring to FIG. 4, FIG. 4 is a schematic diagram of an attention information curve marked in the polar coordinate system. In the embodiment, whether or not the picture quality satisfies the quality requirement is represented with the thickness of lines on the attention information curve. It can be seen from FIG. 4 that an attention information curve with 2000 frames is marked in the polar coordinate system, a thick solid line represents that the picture quality satisfies the quality requirement and a thin solid line represents that the picture quality does not satisfy the quality requirement. As shown by the attention information curve in FIG. 4, the change track of the attention position of the user and changes in the picture quality can be obtained, and whether or not the picture quality satisfies the quality requirement can rapidly be identified so that the pictures that do not satisfy the quality requirement can rapidly be adjusted.

Further, when the picture quality parameter does not satisfy the requirement, the picture quality parameter may be adjusted, that is, after S104, the embodiment of the present application further includes: adjusting the picture quality parameter according to the display of the attention information curve to enable the adjusted picture quality parameter to satisfy the quality requirement. For example, when the picture quality parameter is smaller than a quality parameter threshold value, a resolution estimated value may be adjusted or stream cropping is performed on the picture according to the attention focus position of the user to enable the picture quality parameter to satisfy the quality requirement. When the picture quality is too high, the picture quality may properly be reduced to reduce the play cost.

As polar coordinates may clearly display the view position of the user at any time, the picture quality parameter of the picture having user attention at the main view region of the panoramic video may be increased to satisfy the requirement to the picture quality parameter at part of region of the panoramic video. For example, in the case of stage play performance, there is no need to increase the picture quality parameters of all pictures of the panoramic video, and only the picture quality parameters of pictures at the stage region having more user attentions are increased.

The focus of the embodiments of the present application lies in the attention position information at different time points, and an attention information curve is constructed in the polar coordinate system so that the change track of the attention position of the user may be obtained. In addition, the picture quality parameter is marked on the attention information curve, and therefore, the change track of the attention position of the user and changes in the picture quality can clearly be obtained through observing the attention information curve; as the displayable angle of the polar coordinate system is in the range of 360 degrees, which is consistent with the picture horizontal angle when the user views a panoramic video, and the attention information curve is created in the polar coordinate system, so that the change track of an attention position and the picture quality of each region can be obtained more intuitively and accurately.

In addition, an embodiment of the present application further provides a panoramic video picture display device 200, mainly including a first obtaining module 201, a second obtaining module 202, a creating module 203 and a processing module 204.

Figure 5:
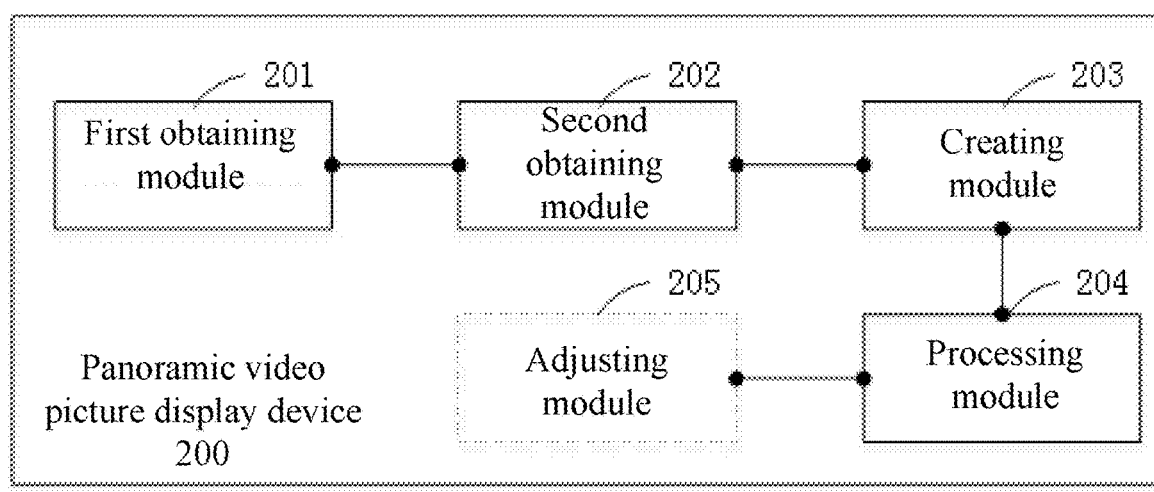
FIG. 5 is a schematic diagram showing the structure of a panoramic video picture quality display device according to an embodiment of the present application.

Referring to FIG. 5, and FIG. 5 is a schematic diagram showing the structure of a panoramic video picture quality display device. In the embodiment, the panoramic video picture display device 200 may mainly include:

a first obtaining module 201, configured to obtain attention position information of a user at different time points in a preset period of time, the attention position information including a picture horizontal angle;

a second obtaining module 202, configured to obtain a picture quality parameter;

a creating module 203, configured to create an attention information curve in a polar coordinate system, the attention information curve taking the time point as a polar radius and the picture horizontal angle obtained by the first obtaining module 201 at the time point as a polar angle; and a processing module 204, configured to mark, on the attention information curve created by the creating module

203, the picture quality parameter obtained by the second obtaining module 202 to display the picture quality parameter.

The preset period of time as described in the embodiment may be a period of play time of the panoramic video or a complete play time of the whole panoramic video.

In an alternative embodiment, there are various ways of marking the picture quality parameter on the attention information curve; the picture quality parameter is marked by using, for example, colors, line widths and line types on the attention information curve; and attention information curves with different colors, line widths and line types may represent different picture quality parameters.

In an alternative embodiment, the processing module 204 may specifically be configured to execute: setting a color on the attention information curve to display the picture quality parameter by means of the color, different colors representing different picture quality parameters; and/or, setting a line width on the attention information curve to display the picture quality parameter by means of the line width, different line widths representing different picture quality parameters; and/or, setting a line type on the attention information curve to display the picture quality parameter by means of the line type, different line types representing different picture quality parameters.

For example, as to the gradual RGB change of colors, the higher the B hue, the higher the quality score, as to the gradual change of line widths, the thicker the line width, the higher the quality score, and the style change of line types is related to the quality score, so that a continuous quality score (the picture quality parameter is expressed as a value, which is corresponding to a quality score) is represented by using the above modes. In this way, value subdivision is performed on the picture quality parameter, and the picture quality scores at different time/different attention positions can be known at any time on the attention information curve so that finer and more accurate adjustment can be made to the picture quality. For example, as the color is of warm hue, it represents that the picture quality satisfies the quality requirement; as the color is of cold hue, it represents that the picture quality does not satisfy the quality requirement. As the line width of the attention information curve exceeds a certain value, it represents that the picture quality satisfies the quality requirement; as the line width of the attention information curve does not exceed a certain value, it represents that the picture quality does not satisfy the quality requirement. As the line type of the attention information curve is a solid line, it represents that the picture quality satisfies the quality requirement. Whether the picture quality requirement satisfies the quality requirement (the picture quality parameter is expressed as whether or not to satisfy the quality requirement) is represented by using the above modes. In this way, whether or not the picture quality satisfies the quality requirement can rapidly be identified on the attention information curve, and the pictures that do not satisfy the quality requirement can rapidly be adjusted.

In an alternative embodiment, the second obtaining module 202 specifically includes a first obtaining submodule, a second obtaining submodule and a third obtaining submodule;

the first obtaining submodule is configured to obtain an attention focus parameter, the attention focus parameter being used for representing an attention level of a user to a picture, and the attention focus parameter being a function of the picture horizontal angle;

the second obtaining submodule is configured to obtain a resolution distribution parameter, the resolution distribution parameter being used for representing the resolution distribution of a picture, and the resolution distribution parameter being a function of the picture horizontal angle; specifically, the second obtaining submodule may be configured to obtain a resolution distribution parameter by a resolution estimated value and the picture horizontal angle and may include: generating a resolution estimated value of each picture horizontal angle of a video picture according to the attention focus parameter, and generating the resolution distribution parameter according to the resolution estimated value of each picture horizontal angle of a video picture; and the third obtaining submodule is configured to combine the attention focus parameter obtained by the first obtaining submodule and the resolution distribution parameter obtained by the second obtaining submodule to obtain the picture quality parameter;

wherein, when there is a very small difference in the attention of the user to the picture content in the vertical direction, the third obtaining submodule is specifically configured to execute: integrating the attention focus parameter and the resolution distribution parameter over the picture horizontal angle to obtain the picture quality parameter Q, $Q=\int_0^{2\pi} F(x)P(x)dx$, wherein, $F(x)$ is the attention focus parameter, $P(x)$ is the resolution distribution parameter, and the value range of the picture horizontal angle is $0$-$2\pi$; and wherein, when the user has more attentions on the picture content in the vertical direction and the picture content in the horizontal direction, that is, there is a greater difference in the vertical content and horizontal content of the picture, the third obtaining submodule is specifically configured to execute: integrating the attention focus parameter and the resolution distribution parameter over the picture horizontal angle and a picture vertical angle to obtain the picture quality parameter Q, $Q=\int_0^{2\pi}\int_0^{\pi} F(x,y)P(x,y)dxdy$, wherein, $F(x, y)$ is the attention focus parameter, $P(x, y)$ is the resolution distribution parameter, the attention position information also includes the picture vertical angle, the value range of the picture horizontal angle is $0$-$2\pi$, and the value range of the picture vertical angle is $0$-$\pi$.

Further, referring to FIG. 5, the panoramic video picture quality display device of the present application may also include an adjusting module 205, and the adjusting module 205 is configured to adjust the picture quality parameter according to the display of the attention information curve to enable the adjusted picture quality parameter to satisfy the quality requirement. For example, a resolution estimated value may be adjusted or stream cropping is performed on the picture according to the attention focus position of the user.

It should be noted that specific implantations of device embodiments of the present application can refer to the method embodiments described above, and will not be repeated herein.

Figure 6:
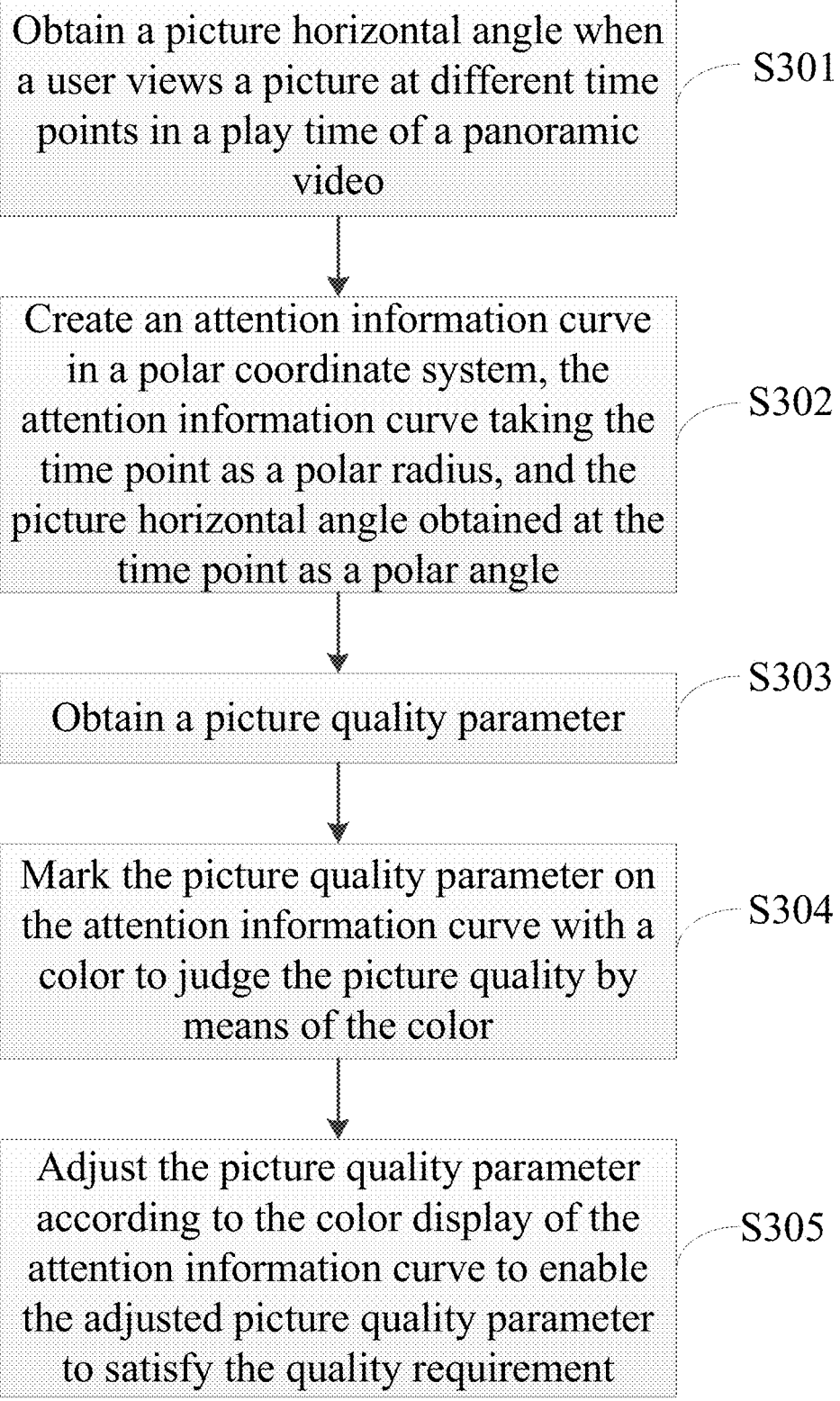
FIG. 6 is another flow chart of a panoramic video picture quality display method according to an embodiment of the present application.

Further, in order to better understand the panoramic video picture quality display method and device provided in the present application, embodiments of the present application also provide a detailed description of a specific application example. Referring to FIG. 6, and FIG. 6 is a flow chart of a panoramic video picture quality display method.

S301, a picture horizontal angle when a user views a picture at different time points in a play time of a panoramic video is obtained;

S302, an attention information curve is created in a polar coordinate system, the attention information curve taking the time point as a polar radius, and the picture horizontal angle obtained at the time point as a polar angle; wherein, the time point and the picture horizontal angle may be taken as the polar radius and the polar angle of the polar coordinate system, respectively, one time point corresponds to one picture horizontal angle, and a plurality of picture horizontal angles may be obtained in the play time of the panoramic video, so that the attention information curve is created in the polar coordinate system;

S303, a picture quality parameter is obtained;

when there is a very small difference in the attention of the user to the picture content in the vertical direction, $Q=\int_0^{2\pi} F(x)P(x)dx$, wherein, Q is the picture quality parameter, F(x) is the attention focus parameter, P(x) is the resolution distribution parameter, and x is the picture horizontal angle;

when the user has more attentions on the picture content in the vertical direction and the picture content in the horizontal direction, that is, there is a greater difference in the vertical content and horizontal content of the picture, $Q=\int_0^{2\pi}\int_0^{\pi} F(x,y)P(x,y)dxdy$, wherein, Q is the picture quality parameter, F(x, y) is the attention focus parameter, P(x, y) is the resolution distribution parameter, x is the picture horizontal angle, y is the picture vertical angle, the value range of x is 0-2π, and the value range of y is 0-π;

wherein, the resolution distribution parameter may be obtained by a resolution estimated value and an attention focus position, that is, a resolution estimated value of the attention focus position of each user to a video picture is generated according to the attention focus parameter, and the resolution distribution parameter is generated according to the resolution estimated value of the attention focus position of each user to a video picture;

S304, the picture quality parameter is marked on the attention information curve with a color to judge the picture quality by means of the color;

referring to FIG. 3, FIG. 3 is a schematic diagram of an attention information curve marked in the polar coordinate system, and on the attention information curve in the figure, the value of the picture quality parameter is represented with a color, wherein, gray with different RGB values is used to represent different picture quality parameters in FIG. 3 for convenience of representation, and a gray histogram in the figure represents a corresponding relation of the values of the picture quality parameter and different RGB values. It can be seen from FIG. 3 that an attention information curve with 2000 frames is marked in the polar coordinate system, the value range of the picture quality parameter is 0-1.0, and the smaller the RGB value of gray, the larger the value of the picture quality parameter. As shown by the attention information curve in FIG. 3, the change track of the attention position of the user and changes in the picture quality can be obtained intuitively and accurately;

S305, the picture quality parameter is adjusted according to the color display of the attention information curve to enable the adjusted picture quality parameter to satisfy the quality requirement.

According to the color display of the attention information curve, picture frames of which the picture quality parameters need to be adjusted can be obtained accurately, thereby adjusting the quality of picture frames with lower picture quality parameters rapidly to enable the adjusted picture quality parameter to satisfy the quality requirement. For example, the resolution estimated value may be adjusted or stream cropping is performed on the picture according to the attention focus position of the user.

In this way, the displaying and adjusting processes of the picture quality of the panoramic video picture quality display method of the present application are completed.

In the panoramic video picture quality display method and device of the present application, attention position information of a user at different time points in a preset period of time is obtained, the attention position information includes a picture horizontal angle; an attention information curve is created in a polar coordinate system, the attention information curve takes the time point as a polar radius and the picture horizontal angle obtained at the time point as a polar angle; and a picture quality parameter can also be obtained and the picture quality parameter is marked on the attention information curve to display the picture quality parameter. In such a way, the change track of an attention position of the user and changes in picture quality can clearly be acquired from the attention information curve; in addition, as the displayable angle of the polar coordinate system is in the range of 360 degrees, which is consistent with the picture horizontal angle when the user views a panoramic video; the attention information curve is created in the polar coordinate system, so that the change track of an attention position and the picture quality of each region can be obtained more intuitively and accurately; and the technical problems that the picture track of interest of a panoramic video is a flattened presentation, the picture quality cannot be displayed, and accurate picture quality reference standards cannot be provided for the panoramic video intuitively and accurately in the prior art are solved.

As used herein, the terms "component," "module", "system", "interface", "process" and the like are generally intended to refer to a computer-related entity: hardware, a combination of hardware and software, software, or software in execution. For example, a component may be, but is not limited to, a process running on a processor, a processor, an object, an executable application, a thread of execution, a program, and/or a computer. By means of illustration, both an application running on a controller and the controller can be components. One or more components may exist within processes and/or threads of execution, and the components may be located on one computer and/or distributed between two or more computers.

Various operations of the embodiments are provided herein. In one embodiment, the one or more operations may constitute computer readable instructions stored on one or more computer readable media that, when executed by an electronic device, will cause the computing device to perform the operations. The order in which some or all of the operations are described should not be interpreted as implying that these operations must be order dependent. Those skilled in the art will understand alternative ordering having the benefit of this specification. Moreover, it should be understood that not all operations are necessarily present in each of the embodiments provided herein.

Moreover, the word "preferred" as used herein is intended to be used as an instance, example, or illustration. Any aspect or design described herein as "preferred" is not necessarily to be construed as more advantageous than other aspects or designs. On the contrary, the use of the word "preferred" is intended to present the concept in a specific way. The term "or" as used in the present application is intended to mean inclusive "or" rather than exclusive "or". That is, unless otherwise specified or clear from the context, "X uses A or B" means naturally including any one that is listed. That is, if X uses A; X uses B; or X uses both A and B, then "X uses A or B" is satisfied in any of the preceding examples.

Moreover, although the present disclosure has been shown and described with respect to one or more implementations, equivalent variations and modifications will occur to those skilled in the art upon reading and understanding the specification and drawings. The present disclosure includes all such modifications and variations and is limited only by the scope of the appended claims. In particular, with respect to various functions performed by the above-mentioned components (elements, resources, etc.), the terms used to describe such components are intended to correspond to any component (unless otherwise indicated) that performs the specified function (e.g., it is functionally equivalent) of the component, even though structurally different from the disclosed structure that performs the function in the exemplary implementation of the present disclosure shown herein. Furthermore, although a particular feature of the present disclosure has been disclosed with respect to only one of several implementations, such feature may be combined with one or more other features of other implementations as may be desirable and advantageous for a given or particular application. Furthermore, to the extent that the terms "comprise", "have", "contain" or variations thereof are used in specific embodiments or claims, such terms are intended to comprise in a manner similar to the term "include".

Functional units in the embodiments of the present invention can be integrated into one processing module, or physically exist separately, or two or more units can be integrated into one module. The above integrated module can be implemented in the form of hardware or a software functional module. If the integrated module is implemented in the form of a software functional module and sold or used as an independent product, it may also be stored in a computer readable storage medium. The storage medium mentioned above may be a read-only memory, a magnetic disk or an optical disk, etc. Each device or system described above can execute the method in the corresponding method embodiment.

Therefore, although the present application has been disclosed in the preferred embodiments, it is not intended to limit the present application, and various modifications and modifications can be made by those skilled in the art without departing from the spirit and scope of the present application, and the scope of the present application shall be defined by the appended claims.

What is claimed is:

1. A panoramic video picture quality display method, comprising:
    obtaining attention position information of a user at different time points in a preset period of time, the attention position information comprising a picture horizontal angle;
    creating an attention information curve in a polar coordinate system, the attention information curve taking the time point as a polar radius and the picture horizontal angle obtained at the time point as a polar angle;
    obtaining a picture quality parameter and setting a color on the attention information curve to display the picture quality parameter by means of the color, different colors representing different picture quality parameters; and/or
    setting a line width on the attention information curve to display the picture quality parameter by means of the line width, different line widths representing different picture quality parameters; and/or
    setting a line type on the attention information curve to display the picture quality parameter by means of the line type, different line types representing different picture quality parameters; wherein
    the obtaining the picture quality parameter comprises:
    obtaining an attention focus parameter, the attention focus parameter being used for representing an attention level of a user to a picture, and the attention focus parameter being a function of the picture horizontal angle;
    obtaining a resolution distribution parameter, the resolution distribution parameter being used for representing resolution distribution of a picture, and the resolution distribution parameter being a function of the picture horizontal angle; and
    combining the attention focus parameter and the resolution distribution parameter to obtain the picture quality parameter.

2. The panoramic video picture quality display method of claim 1, wherein the combining the attention focus parameter and the resolution distribution parameter to obtain the picture quality parameter comprises:
    integrating the attention focus parameter and the resolution distribution parameter over the picture horizontal angle to obtain the picture quality parameter Q, $Q=\int_0^{2\pi} F(x)P(x)dx$, wherein, $F(x)$ is the attention focus parameter and $P(x)$ is the resolution distribution parameter; or
    integrating the attention focus parameter and the resolution distribution parameter over the picture horizontal angle and a picture vertical angle to obtain the picture quality parameter Q, $Q=\int_0^{2\pi} F(x, y)P(x, y)dxdy$, wherein, $F(x, y)$ is the attention focus parameter, $P(x, y)$ is the resolution distribution parameter, and the attention position information also comprises the picture vertical angle.

3. The panoramic video picture quality display method of claim 1, further comprising:
    adjusting the picture quality parameter according to the display of the attention information curve to enable the adjusted picture quality parameter to satisfy a quality requirement.

4. The panoramic video picture quality display method of claim 1, wherein the obtaining the attention position information of a user at different time points in a preset period of time comprises:
    obtaining multiple pieces of attention position information of the user in the preset period of time at a preset time interval, wherein each of the time points corresponds to one piece of the attention position information, and the picture horizontal angle is an attention position of eyes of the user to a picture in a horizontal direction at the time point.

5. A panoramic video picture quality display method, comprising:
    obtaining attention position information of a user at different time points in a preset period of time, the attention position information comprising a picture horizontal angle;
    creating an attention information curve in a polar coordinate system, the attention information curve taking the time point as a polar radius and the picture horizontal angle obtained at the time point as a polar angle; and
    obtaining a picture quality parameter and marking the picture quality parameter on the attention information curve to display the picture quality parameter,.
    wherein the marking the picture quality parameter on the attention information curve to display the picture quality parameter comprises:

setting a color on the attention information curve to display the picture quality parameter by means of the color, different colors representing different picture quality parameters; and/or setting a line width on the attention information curve to display the picture quality parameter by means of the line width, different line widths representing different picture quality parameters; and/or setting a line type on the attention information curve to display the picture quality parameter by means of the line type, different line types representing different picture quality parameters.

6. The panoramic video picture quality display method of claim 5, wherein the obtaining the picture quality parameter comprises:
   obtaining an attention focus parameter, the attention focus parameter being used for representing an attention level of a user to a picture, and the attention focus parameter being a function of the picture horizontal angle;
   obtaining a resolution distribution parameter, the resolution distribution parameter being used for representing resolution distribution of a picture, and the resolution distribution parameter being a function of the picture horizontal angle; and
   combining the attention focus parameter and the resolution distribution parameter to obtain the picture quality parameter.

7. The panoramic video picture quality display method of claim 6, wherein the combining the attention focus parameter and the resolution distribution parameter to obtain the picture quality parameter comprises:
   integrating the attention focus parameter and the resolution distribution parameter over the picture horizontal angle to obtain the picture quality parameter Q, $Q=\int_0^{2\pi} F(x)P(x)dx$, wherein, $F(x)$ is the attention focus parameter and $P(x)$ is the resolution distribution parameter; or
   integrating the attention focus parameter and the resolution distribution parameter over the picture horizontal angle and a picture vertical angle to obtain the picture quality parameter Q, $Q=\int_0^{2\pi}\int_0^{\pi} F(x, y)P(x, y)dxdy$, wherein, $F(x, y)$ is the attention focus parameter, $P(x, y)$ is the resolution distribution parameter, and the attention position information also comprises the picture vertical angle.

8. The panoramic video picture quality display method of claim 5, further comprising:
   adjusting the picture quality parameter according to the display of the attention information curve to enable the adjusted picture quality parameter to satisfy a quality requirement.

9. The panoramic video picture quality display method of claim 5, wherein the obtaining the attention position information of a user at different time points in a preset period of time comprises:
   obtaining multiple pieces of attention position information of the user in the preset period of time at a preset time interval, wherein each of the time points corresponds to one piece of the attention position information, and the picture horizontal angle is an attention position of eyes of the user to a picture in a horizontal direction at the time point.

10. A panoramic video picture quality display device, comprising:
    a processor configured to:
    obtain attention position information of a user at different time points in a preset period of time, the attention position information comprising a picture horizontal angle;
    obtain a picture quality parameter;
    create an attention information curve in a polar coordinate system, the attention information curve taking the time point as a polar radius and the picture horizontal angle obtained by the processor at the time point as a polar angle;
    mark, on the attention information curve created by the processor, the picture quality parameter obtained by the processor to display the picture quality parameter; and
    execute: setting a color on the attention information curve to display the picture quality parameter by means of the color, different colors representing different picture quality parameters; and/or
    setting a line width on the attention information curve to display the picture quality parameter by means of the line width, different line widths representing different picture quality parameters; and/or
    setting a line type on the attention information curve to display the picture quality parameter by means of the line type, different line types representing different picture quality parameters.

11. The panoramic video picture quality display device of claim 10, wherein the processor is further configured to:
    obtain an attention focus parameter, the attention focus parameter being used for representing an attention level of a user to a picture, and the attention focus parameter being a function of the picture horizontal angle;
    obtain a resolution distribution parameter, the resolution distribution parameter being used for representing resolution distribution of a picture, and the resolution distribution parameter being a function of the picture horizontal angle; and
    combine the attention focus parameter obtained by the processor and the resolution distribution parameter obtained by the processor to obtain the picture quality parameter; wherein,
    the processor is further configured to execute:
    integrating the attention focus parameter and the resolution distribution parameter over the picture horizontal angle to obtain the picture quality parameter Q, $Q=\int_0^{2\pi} F(x)P(x)dx$, wherein, $F(x)$ is the attention focus parameter and $P(x)$ is the resolution distribution parameter; or
    integrating the attention focus parameter and the resolution distribution parameter over the picture horizontal angle and a picture vertical angle to obtain the picture quality parameter Q, $Q=\int_0^{2\pi}\int_0^{\pi} F(x, y)P(x, y) dxdy$, wherein, $F(x, y)$ is the attention focus parameter, $P(x, y)$ is the resolution distribution parameter, and the attention position information also comprises the picture vertical angle.

12. The panoramic video picture quality display device of claim 10, wherein the processor is further configured to,
    adjust the picture quality parameter according to the display of the attention information curve to enable the adjusted picture quality parameter to satisfy a quality requirement.

* * * * *